United States Patent
Gershey et al.

(10) Patent No.: US 12,015,812 B2
(45) Date of Patent: *Jun. 18, 2024

(54) METHOD AND SYSTEM FOR SELF-CORRECTING MATCH STATES

(71) Applicant: SimpleBet, Inc., New York, NY (US)

(72) Inventors: Simon Gershey, New York, NY (US); Kyle Engel, New York, NY (US); Dave Lucia, New York, NY (US); Zachary Schumacher, New York, NY (US)

(73) Assignee: SimpleBet, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/930,159

(22) Filed: Sep. 7, 2022

(65) Prior Publication Data

US 2023/0007325 A1 Jan. 5, 2023

Related U.S. Application Data

(63) Continuation of application No. 17/308,279, filed on May 5, 2021, now Pat. No. 11,451,842.

(Continued)

(51) Int. Cl.
*H04N 21/2187* (2011.01)
*G06N 20/00* (2019.01)
(Continued)

(52) U.S. Cl.
CPC ........ *H04N 21/251* (2013.01); *G06N 20/00* (2019.01); *H04N 21/2187* (2013.01); *H04N 21/25891* (2013.01); *H04N 21/26291* (2013.01)

(58) Field of Classification Search
None
See application file for complete search history.

(56) References Cited

U.S. PATENT DOCUMENTS

2014/0129371 A1* 5/2014 Wilson ............... G06Q 30/0631
705/26.7
2016/0352603 A1* 12/2016 VanAntwerp ........... H04L 65/70
(Continued)

FOREIGN PATENT DOCUMENTS

CN 106464958 A * 2/2017 ......... G06K 9/00724
CN 111832780 A * 10/2020

*Primary Examiner* — William J Kim
(74) *Attorney, Agent, or Firm* — ICE MILLER LLP

(57) ABSTRACT

A system and method arranged to predict a match state event by a machine learning platform. The system and method including monitoring, by the machine learning platform, multimedia content on a live data feed, receiving, by the machine learning platform, current match state data corresponding to the multimedia content, and predicting, by the machine learning platform, an anomaly in the multimedia content based on an analysis of received multimedia content and current match state data. The system and method can include generating, by the machine learning platform, a confidence score regarding a likelihood of the anomaly in the multimedia content, and resolving, by the machine learning platform, the anomaly based on the confidence score. Resolving the anomaly includes extracting a portion of the multimedia content containing the anomaly, ignoring the anomaly, or correcting the anomaly.

20 Claims, 5 Drawing Sheets

Related U.S. Application Data

(60) Provisional application No. 63/120,584, filed on Dec. 2, 2020.

(51) Int. Cl.
*H04N 21/25* (2011.01)
*H04N 21/258* (2011.01)
*H04N 21/262* (2011.01)

(56) References Cited

U.S. PATENT DOCUMENTS

| | | | |
|---|---|---|---|
| 2017/0310546 A1* | 10/2017 | Nair | H04L 41/0654 |
| 2018/0084310 A1* | 3/2018 | Katz | G06F 16/7837 |
| 2019/0043500 A1* | 2/2019 | Malik | H04N 21/2187 |
| 2019/0259041 A1* | 8/2019 | Jackson | G06F 16/288 |
| 2020/0134441 A1* | 4/2020 | Suthar | G06F 11/3495 |
| 2020/0257943 A1* | 8/2020 | Huber | G06N 7/01 |
| 2020/0265269 A1* | 8/2020 | Yeung | G06V 20/42 |
| 2021/0390455 A1* | 12/2021 | Schierz | G06N 5/04 |
| 2022/0159085 A1* | 5/2022 | Gaetje | H04L 67/52 |

\* cited by examiner

METHOD AND SYSTEM FOR SELF-CORRECTING MATCH STATES

CROSS-REFERENCE TO RELATED APPLICATION

This application is a continuation of U.S. patent application Ser. No. 17/308,279, filed May 5, 2021, now issued as U.S. Pat. No. 11,451,842, which claims priority to and the benefit of provisional U.S. Patent Application No. 63/120,584, filed Dec. 2, 2020, all of which are hereby incorporated herein by reference in their entireties.

FIELD OF THE DISCLOSURE

The present disclosure relates to a method, a system, and a computer program for self-correcting match states, including a machine learning prediction system and a data processing mechanism that can operate in an error-prone or noisy origination or delivery environment for multimedia content.

BACKGROUND OF THE DISCLOSURE

In computer network environments such as the Internet, communicating devices can be implemented that ingest large amounts of data in real-time, including live web feeds such as, for example, RSS (Really Simple Syndication) feeds, JSON (JavaScript Object Notion) Feeds, Atom feeds, or hAtom feeds, FeedSync, Web Sub or Mashup, among others. In many instances, the ingested data includes anomalies that result from error-prone or noisy media or platforms that source or deliver the multimedia content to the communicating devices.

An urgent and unfulfilled need exists for a technology platform and methodology that can identify and resolve anomalies or artifacts that can appear in multimedia content platforms.

SUMMARY OF THE DISCLOSURE

The instant disclosure includes a method, a system, and a computer program for self-correcting match states, including a machine learning prediction system and a data processing mechanism that can operate in an error-prone or noisy multimedia content delivery environment. The disclosure includes a technology platform and methodology that can identify and resolve anomalies that can appear in multimedia content platforms.

In a non-limiting embodiment, a computer-implemented method is provided for predicting a match state event by a machine learning platform. The method comprises: receiving, by machine learning platform, a live data feed; monitoring, by the machine learning platform, multimedia content on the live data feed; receiving, by the machine learning platform, current match state data corresponding to the multimedia content; predicting, by the machine learning platform, an anomaly in the multimedia content based on an analysis of received multimedia content and current match state data; generating, by the machine learning platform, a confidence score regarding a likelihood of the anomaly in the multimedia content; and resolving, by the machine learning platform, the anomaly based on the confidence score. Resolving the anomaly can include extracting a portion of the multimedia content containing the anomaly, ignoring the anomaly, or correcting the anomaly.

The computer-implemented method can comprise forwarding the extracted portion of the multimedia content to an intelligent technology platform to analyze and predict a future event state based, at least in part, on the multimedia content.

The computer-implemented method can comprise receiving, by the machine learning platform, historical event data comprising past live data feed updates.

The computer-implemented method can comprise receiving, by the machine learning platform, historical event data comprising past match states.

The computer-implemented method can comprise receiving, by the machine learning platform, historical event data comprising past live data feed updates and past match states.

The computer-implemented method can comprise receiving, by the machine learning platform, historical event data comprising past live data feed updates and past match states. The predicting, by the machine learning platform, the anomaly in the multimedia content can include analyzing the past live data feed updates and the past match states.

In the computer-implemented method, resolving the anomaly can comprise: determining processor computing time or memory capacity required to correct the anomaly; or predicting, by the machine learning platform, correctability of the anomaly.

In the computer-implemented method, correctability of the anomaly can comprise waiting for an update of the multimedia content that resolves the anomaly.

In a non-limiting embodiment, a system is provided for predicting a match state event by a machine learning platform. The system comprises a communication unit arranged to receive a live data feed; a match state collector arranged to store match state data; an anomaly predictor arranged to monitor multimedia content on the live data feed, receive match state data from the match state collector, predict, by a machine learning platform, accuracy of the multimedia content based on the multimedia content and corresponding match state data received from the match state collector, and, generate, by the machine learning platform, a confidence score for each element of the multimedia content; and an error corrector arranged to resolve an anomaly in the multimedia content based on the confidence score, wherein resolving the anomaly includes extracting a portion of the multimedia content containing the anomaly, ignoring the anomaly, or correcting the anomaly.

The system can comprise a match state predictor unit arranged to receive the multimedia content and predict a future event state based, at least in part, on the multimedia content.

In the system, the anomaly predictor can be arranged to receive historical event data comprising past live data feed updates and/or to receive historical event data comprising past match states.

In the system, the anomaly predictor can comprise a machine learning system. The machine learning system can be trained to: receive historical event data comprising past live data feed updates and past match states; and predict the anomaly in the multimedia content based, at least in part, on the past live data feed updates and the past match states.

In the system, the machine learning system can be trained: to determine processor computing time or memory capacity required to correct the anomaly; or predict correctability of the anomaly.

In the system, correctability of the anomaly can comprise waiting for an update of the multimedia content that resolves the anomaly.

In a non-limiting embodiment, a non-transitory computer-readable storage medium is provided, which contains computer executable instructions that, when executed by a computing device containing a machine learning system, cause the computing device to perform operations comprising: receiving, by machine learning system, a live data feed; monitoring, by the machine learning system, multimedia content on the live data feed; receiving, by the machine learning system, current match state data corresponding to the multimedia content; predicting, by the machine learning system, an anomaly in the multimedia content based on an analysis of received multimedia content and current match state data; generating, by the machine learning system, a confidence score regarding a likelihood of the anomaly in the multimedia content; and resolving, by the machine learning system, the anomaly based on the confidence score, wherein resolving the anomaly includes extracting a portion of the multimedia content containing the anomaly, ignoring the anomaly, or correcting the anomaly.

Additional features, advantages, and embodiments of the disclosure may be set forth or apparent from consideration of the specification, including the detailed description, claims and drawings. The summary of the disclosure and the following detailed description and drawings may provide examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain principles of the disclosure. No attempt is made to show structural details of the disclosure in more detail than may be necessary for a fundamental understanding of the disclosure and the various ways in which it can be practiced.

Figure 1:
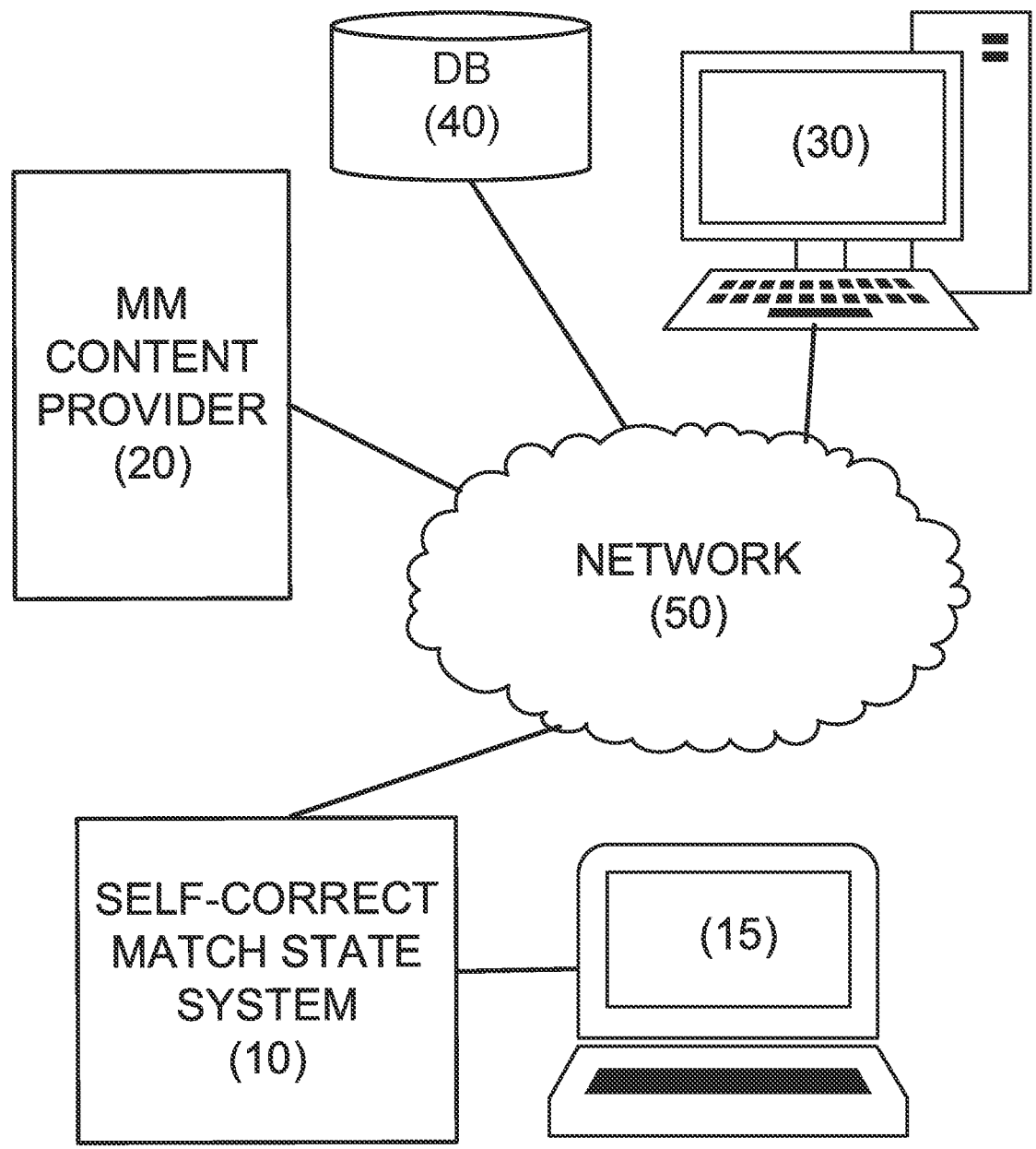
FIG. 1 shows a block diagram of a non-limiting embodiment of a self-correcting system, constructed according to the principles of the disclosure.

The present disclosure is further described in the detailed description that follows.

DETAILED DESCRIPTION OF THE DISCLOSURE

The disclosure and the various features and advantageous details are explained more fully with reference to the non-limiting embodiments and examples that are described or illustrated in the accompanying drawings and detailed in the following description. It should be noted that the features illustrated in the drawings are not necessarily drawn to scale, and features of one embodiment can be employed with other embodiments, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those of skill in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks carry a vast range of computer resources and services. Computer networks can, for example, by means of the Internet, transmit computer resources over a global system of interconnected computer networks that use the Internet protocol suite (TCP/IP) to link communicating devices worldwide. The computer resources can include multimedia content such as, for example, video content, audio content, textual content, data, data objects, computer program instructions, inter-linked hypertext documents and applications of the World Wide Web (WWW), electronic mail, telephony and file sharing. The multimedia content can include data objects containing attribute-value pairs, array data types, or any serializable values.

In computer network environments such as the Internet, multimedia content can include anomalies that can render the content unusable by many machine learning (ML) platforms. The multimedia content can originate from noisy or error-prone sources, or it can be received via noisy or error-prone transmission platforms that can inject, or cause injection of, anomalies into the multimedia content. An anomaly can include one or more artifacts or errors that can render the content unrecognizable or unusable by an intelligent technology (INT) platform, such as, for example, an ML platform. An anomaly can include the absence of data necessary for the ML platform the analyze the surrounding data in multimedia content. The disclosure provides a system that can identify an anomaly in multimedia content, as well as resolve the anomaly to make the content usable by the INT platform. The system can be arranged to predict the presence of one or more anomalies in the multimedia content.

The disclosure provides a self-correcting system that can predict a match state (MS) event accurately and in real-time based on received multimedia content, regardless of whether the content includes anomalies. The system can be arranged to analyze multimedia content and identify an anomaly. The system can be arranged to identify the anomaly by predicting the presence and location of the anomaly. The system can be arranged to resolve the anomaly so that the content can be recognizable and analyzable by the INT platform, including for example, (i) extracting the anomaly, or a portion containing the anomaly, from the multimedia content, (ii) ignoring the anomaly (for example, until it is corrected), or (iii) correcting the anomaly.

FIG. 1 illustrates a block diagram of a non-limiting embodiment of a self-correcting system 1, constructed according to the principles of the disclosure. The system 1 can include a self-correct match state (SCMS) server 10. The system 1 can include a computing device 15, a content provider server 20, a communicating device 30, a database (DB) 40, and a network 50. The communicating device 30 can include, for example, a communicating device of an end user. Each of the computer assets 10, 15, 20, 30 or 40 can include a communicating device, any of which can be arranged to connect to any other communicating device that is internal or external to the system 1. The computer assets can be connected by means of a communication link, either directly or indirectly, such as, for example, through the network 50.

In a non-limiting embodiment, the SCMS server 10 can be arranged to build or train one or more machine learning (ML) models for deployment by the SCMS server 10. In alternative non-limiting embodiment, the ML model(s) can be built or trained by the computing device 15 or by the communication device 30, in which case the SCMS server 10 can be arranged to download the ML model from the device 15 or the device 30, respectively. In another non-limiting embodiment, the ML model can be provided on a computer readable medium and uploaded/downloaded to the SCMS server 10.

With one ore more ML models installed, the SCMS server 10 can be arranged to connect to one or more content sources, such as, for example, the content provider server 20, and receive multimedia content in real-time via one or more live feeds. The received live feeds can include, for example, an RSS feed, a JSON feed, an Atom feed, an hAtom feed, a FeedSync feed, a Web Sub feed, a Mashup feed, or any suitable web or broadcasting feed.

The SCMS server 10 can be arranged to connect to the DB 40, which can be arranged to contain and manage multimedia content, including historical multimedia content. The DB 40 can include a communicating device. The DB 40 can be arranged as a separate computing device, as seen in the non-limiting embodiment depicted in FIG. 1, or it can be included in the SCMS server 10 or co-located with the SCMS server 10.

The DB 40 can be arranged to store multimedia content, which can include computer resources. Multimedia content in the DB 40 can be populated, updated, searched, retrieved or sent by a database management system (DBMS) in the DB 40. The multimedia content can be searched or retrieved in response to a query from the SCMS server 10. The retrieved multimedia content can be transmitted to the SCMS server 10. The multimedia content can be searched, located and retrieved in response to a query received from the SCMS server 10. The multimedia content can be searched, located or retrieved in response to a remote procedure call (RPC) initiated by the SCMS server 10.

The DB 40 can include a Big Data database. The DB 40 can include, for example, a data lake, Hadoop, HBase, NoSQL, PostGres MySQL, or any database or system that can store large amounts of data, and search or retrieve requested data in high-performance computing applications such as, for example, Big Data analysis. The DB 40 can store large amounts of activity log data, for example, exabytes, zettabytes, yottabytes, or larger amounts of activity log data. The DB 40 can storage large amounts of historical event data, training set data (or training datasets) and testing set data (or testing datasets).

The DB 40 can be populated with records containing multimedia content such as historical and real-time (live) event data. The historical or real-time event data can include, for example, sporting event data that contains values for each type of sporting event, including, for example, baseball game, basketball game, football game, soccer game, tennis game, golf game, hockey game, automotive race, combat sports, or any other sporting event. The historical or real-time event data can include, for example, MLB (Major League Baseball) historical or real-time data, NBA (National Basketball Association) historical or real-time data, NCAA (National College Athletic Association) historical or real-time data, NFL (National Football League) historical or real-time data, game statistics, daily boxscore, daily change log, daily schedule, daily summary, daily transactions, game boxscore, game pitch metrics, game summary, glossary, injuries, league depth chart, league hierarchy, league leaders, league schedule, play-by-play, player profile, rankings, seasonal pitch metrics, seasonal splits, seasonal statistics, seasonal transactions, series schedule, series statistics, series summary, standings, team depth chart, team profile, venues, season mappings, standings, team mappings, team profiles team seasonal statistics, venue mappings, or any other player, team, sport or venue related information that can be analyzed to predict a sporting event, including performance by each player, team, venue, or sport.

The multimedia content can include content received from the one or more content sources, including the content provider server 20. The multimedia content can include real-time data streams or historical files or data, including, training data or training datasets, and testing data or datasets. The training data or datasets can include data with corresponding annotations for supervised or unsupervised machine learning. The training data or datasets can include annotated data.

In a non-limiting embodiment, the DB 40 includes a large volume of data records (for example, thousands, millions, billions, or more data records), each of which can contain multimedia content that includes a data type such as, for example, a number, a string of unicode characters, a Boolean value, an array (or ordered list) of elements, an object (for example, key, string, or a name-value pair), a whitespace, or any data type needed to generate or parse the data, as disclosed herein. The multimedia content can include a computer application, an application programing interface (API), web content or any static or moving multimedia content, including, for example, Internet media content, textual content, sound content, video content, data, computer program instructions, or any type of computer resource that can be generated, parsed, recognized, analyzed or rendered by the SCMS server 10.

The DB 40 can be arranged to receive and store historical or real-time event data according to a database schema. The DB 40 can include multimedia content containing historical event data, including, for example, historical data for weather events, sporting events, or any type of event for which a need or desire might exist to predict details or a result of the event at some point in the future. In a non-limiting embodiment, the historical event data can include weather event data that contains values for each weather parameter to be predicted, as well as testing data to verify a trained ML model. The historical event data can include parametric data such as time, date, temperature, pressure, humidity, solar radiation levels, heat transfer, wind/air velocity and director vectors, the phase change of water, surface hydrology, geographic location coordinates and any other information that can be analyzed by the ML model to predict a weather event at a particular location or region at some point in time in the future, as well as to test the ML model against the dataset to be able to predict past weather events based on historical data so as to verify the accuracy of the ML model and, where necessary, tune the parametric values in the model.

In a non-limiting embodiment, the multimedia content can include an HTML document that can be assisted by technologies such as Cascading Style Sheets (CSS) and scripting languages such as JavaScript. The multimedia content can include image rendering commands such as, for example, JavaScript commands, which can be embedded in the HTML document to affect the behavior and content of web content when it is rendered by the SCMS server 10.

In a non-limiting embodiment, the multimedia content includes content in an open standard file format, such as, for example, XML (Extensible Markup Language) or JSON, including a data interchange format that uses readable text to store and transmit data objects having attribute—value pairs and array data types, or any suitable serializable values. The content can be received from a live data feed via, for example, an application program interface (API). The content can include a syntactic framework for data interchange between, for example, the MM content provider server 20 and the SCMS server 10 or communicating device 30. The multimedia content can include a schema arranged to specify, for example, a JSON-based format, and to define the structure of data (for example, XML or JSON data) for validation, documentation or interaction control.

Figure 2:
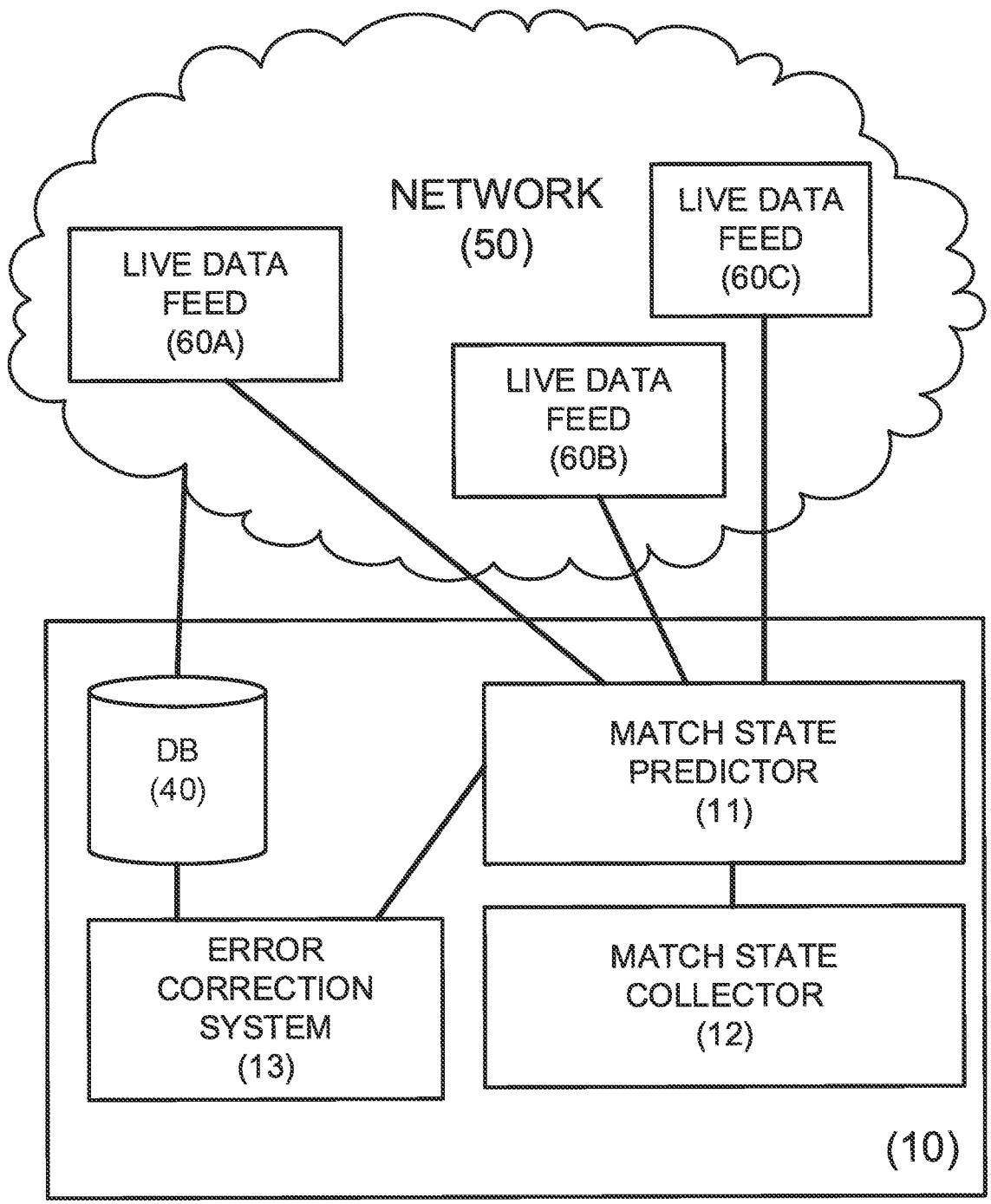
FIG. 2 shows a non-limiting embodiment of a self-correcting match state server arranged to connect to a plurality of multimedia content feed sources in the self-correcting system of FIG. 1.

FIG. 2 illustrates a non-limiting embodiment of the SCMS server 10 arranged to connect to a plurality of live data feeds 60 (for example, 60A, 60B, 60C). In this non-limiting embodiment, the live data feed 60A originates from the MM content provider 20 (shown in FIG. 1) and the live data feeds 60B and 60C originate from other multimedia content providers (not shown). Each live data feed 60 can include multimedia content, including event update data in, for example, XML or JSON format. Event update data can include live data updates relating to a live (or real-time) event that is the subject of the live data feeds 60.

The SCMS server 10 can include a match state predictor 11, a match state collector 12, and an error correction system 13. The match state predictor 11 and error correction system 13 can be combined into a single computer asset. The match state predictor 11 and/or error correction system 13 can include an INT platform. The SCMS server 10 can include the DB 40, or it can be connected to the DB 40 via a communication line, as seen in the embodiment depicted in FIG. 1.

In the embodiment depicted in FIG. 2, the network 50 can include a computer cloud and a plurality of live data feeds 60. The live data feed 60 can include, or connect to, one or more communicating devices located in the computer cloud. The live data feed 60 can be received from a communication device located external to the network 50, such as, for example, the MINI content provider 20 (shown in FIG. 1). The match state predictor 11 can be arranged to receive event update data relating to an event occurring in real-time, such as, for example, a sporting event, a weather event or any event having parametric values that can change with respect to time and where historical event data can be analyzed to predict a match state at a future time based on the content received from the live data feed 60. A match state can include, for example, the present, real-time state of a match such as a sporting event or a weather event, such as, for example, a tornado, a hurricane or a blizzard.

The match sate predictor 11 and error correction system 13 can each include a computing device, or be included in a computing device. They can each (or both) include an INT platform containing supervised machine learning, unsupervised machine learning or a combination of supervised and unsupervised machine learning. The INT platform can include, for example, an artificial neural network (ANN), a convolutional neural network (CNN), a temporal convolutional network (TCN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), a long short-term memory (LSTM), Naive Bayes, decision trees, linear regression, Q-learning, temporal difference (TD), deep adversarial networks, fuzzy logic, or any other machine intelligence platform capable of supervised or unsupervised machine learning. The match state predictor 11 can include one or more platform-neutral or platform-agnostic APIs. The match state predictor 11 and/or error correction system 13 can include, for example, Standard Regression (SR), Support Vector Regression (SVR), Ridge Regression (Ridge), Random Forest (RF), Autoregressive Integrated Moving Average (AMNIA), Vector Auto Regression (VAR), Arbitrage of Forecasting Expert (AFE), Extra-Tree Regression (ETR), Multilayer Perceptron (MLPR), or Vector Error Correction Model (VECM), or another statistical forecasting technology.

The match state predictor 11 can be arranged to analyze multimedia content and predict a match state for an event occurring in real-time. The match state predictor 11 can be arranged to self-correct current match state data relating to a live, real-time event. The prediction can be made by a machine learning event (MLE) model in the INT platform. In a non-limiting embodiment, the prediction can be made by a rule-based decision tree.

In a non-limiting embodiment, the match state predictor 11 includes the INT platform containing the MLE model. The match state predictor 11 can be arranged to receive or retrieve multimedia content containing historical event data, for example, from the DB 40, and build the MLE model such that it can accurately and consistently predict a future event based on event update data, which can include real-time event data, received from one or more live data feeds 60. The MLE model can be trained and tested based on training datasets and testing datasets, respectively. The training datasets and testing datasets can be contained in the multimedia content received from, for example, the DB 40. Once trained and operational, the MLE model can operate to continuously learn and self-adjust its parametric values to accurately and consistently predict future events based on the received live data feeds 60.

The match state collector unit 12 can include a computing device having a memory arranged to store current match state data, including, for example, the current real-time status of all parametric values in an event under consideration. The computing device can be arranged to interact with the MLE model in the match state predictor 11 and facilitate updating or adjustment of parametric properties of the MLE model. The match state collector 12 can include current match state data, including, for example, real-time Major League Baseball (MLB) match event information for a match event that includes a baseball game. In this embodiment, the MLB match event information can include, for example, the count (for example, balls/strikes), the number of outs, whether or not there are players on 1st/2nd/3rd base, the inning, the home/away score, the temperature, the humidity, the wind direction, the wind speed, the altitude, the atmospheric pressure, the ultraviolet (UV) index, the current batter, the batter on deck, and the current pitcher.

In the non-limiting embodiment depicted in FIG. 2, the live data feed 60 includes three live data feeds 60A, 60B, 60C, each of which can include, or be connected to, a communicating device arranged to transmit live event-by-event data (60A), live weather data (60B) and live player injury update data (60C), respectively. The multimedia content data received from the live data feeds 60 can include event update data reflecting the current state of a body of data that changes dynamically, such as live update data reflecting the current match state of a sporting event. In such instances, the live data feed can be error-prone or noisy, containing anomalies that can render the data unanalyzable by the INT platform in the match state predictor 11. The MLE model can be built and arranged to implement machine learning modeling and rule-based decision tree processing to predict elements in the live data feed that are likely correct or likely incorrect. The live data feed can include event-by-event information relating to sporting matches, weather conditions, or player injuries, among others. The MLE model can be arranged to learn, self-adjust and correct, ignore, or extract as-is certain elements of a particular live data feed. The MLE model can be arranged to analyze and resolve error-prone or noisy live data streams from the live data feeds 60, such as, for example, live sporting event data feeds, weather data feeds, among others.

The live data feed 60 can include any source of data relating to an event under consideration that is time-sensitive and updates frequently. For example, in sports betting applications, the live data feeds can include (a) event-by-event match updates, (b) weather condition updates, and (c) player injury updates. In other applications, such as, for example, finance, the live data feed can include tick-by-tick prices of a stock, or a snapshot-in-time of an order book. In a non-limiting embodiment, the live data feeds can be broken down into individual data elements. Breaking down the live data feed into individual data elements can allow an error correct unit 170 (shown in FIG. 3) to assess the accuracy on of specific aspects of the data, instead of the data as a whole. A data element can include, for example, a parametric value used by the INT platform of the match state predictor 11 and/or error correction system 13.

For example, a live data feed of weather conditions can contain the following information: temperature=75° degrees Fahrenheit; wind=100 mph (miles-per-hour); and wind direction=SSW (south-southwest). In this example, by breaking down the data feed into individual data elements (temperature, wind speed, wind direction parameters), the error correction system 13 can be arranged to quarantine, ignore, correct or reject only certain elements of the data feed (for example, 100 mph wind speed) when the live data feed is inconsistent with the current or past match states (for example, the wind speed data for the current or past states) instead of rejecting the full data. The error correction system 13, which can include a match state machine learning model (discussed below), can be arranged to provide, as output, the probability (or confidence score) that each individual element of the live data feed is correct. In this example, the error correction system 13 can output: temperature confidence score=95% for temperature=75° Fahrenheit; wind confidence score=1% for wind=100 mph; and, wind direction confidence score=94% for wind direction=SSW.

A significant and, potentially, debilitating problem with receiving live event update data from the live data feeds 60A, 60B and 60C is that the sources can be error-prone, or they can transmit multimedia content containing anomalies that can be unrecognizable or unanalyzable, or that can render the multimedia content unrecognizable or unanalyzable by downstream INT platforms, such as, for example, the MLE model in the match state predictor 11. Anomalies contained in the received multimedia content can result in event updates (or the historical event data containing such anomalies) being unusable by the match state predictor 11, thereby resulting in the INT platform incorrectly building, training or tuning the MLE model, such that the model may not be able to accurately predict future events based on the event updates received from the live data feed 60. In a non-limiting embodiment, the live data feed 60 can include a sports data application program interface (API) that provides error-prone human-keyed data based on live observation of the sporting event.

In a non-limiting embodiment, the event updates received from the live data feed 60 can include JSON-based live sporting event data. Accuracy of such data feeds can be critical to downstream communicating devices that depend on their accuracy to accurately track match states and predict future match events, such as, for example, weather events (for example, tornado, hurricane or blizzard) or sporting events (for example, outcome or state of a sporting match between sports teams). Accurately tracking match state can have downstream implications in applications such as, for example, weather predictions, public safety alerts, sporting event broadcasts, fan engagement platforms, and live betting products. With live betting products, accurately tracking match state is required to accurately create, administer, and price results in-play betting markets.

The error correction system 13 can be arranged to identify and resolve the anomalies such that the multimedia content can be recognizable and analyzable by the INT platform in the match state predictor 11 to correctly build, train or adjust the parametric properties of the MLE model, thereby ensuring the quality of resolved multimedia content meets the requirements of downstream INT platforms and computing devices. In order to ensure high quality, detailed and accurate event predictions by the match state predictor 11, the error correction system 13 can be arranged to catch and resolve anomalies in multimedia content (including event updates) before the content is input to the match state predictor 11.

The error correction system 13 can be arranged to connect to the DB 40 or the live data feed 60 and predict an anomaly in received multimedia content, which can include event updates or historical event data, that might be unrecognizable or unanalyzable, or render a portion of the received content unrecognizable or unanalyzable by the MLE model in the match state predictor 11. The error correction system 13 can be arranged to identify (or predict) and resolve any anomalies that might exist in the content.

In a non-limiting embodiment, after identifying an anomaly in the content, the error correction system 13 can be arranged to quarantine the content record, or a portion thereof, containing the anomaly and encode the corresponding object into, for example, a JSON string, thereby serializing the anomaly. The serialized anomaly can enable a process, such as, for example, ephemeral ETL (extract, transform, load) to automatically tell if that anomaly has been resolved and mark the anomaly accordingly. In an embodiment, a python function can be serialized using the pickle protocol and stored in the DB 40 in a field called "resolution_callback". This allows the error correction system 13, for every anomaly that it stores, to know exactly what it takes to resolve it itself. In this embodiment, the error correction system 13 can be arranged to read in each anomaly, attempt to resolve it, and if the "resolution_callback" evaluates to True, set a Boolean "is_resolved" flag to True. The error correction system 13 can then know that that record containing the anomaly is no longer an issue and move it forward and through the data pipeline in the match state predictor 11.

In a non-limiting embodiment, the error correction system 13 can be arranged to analyze multimedia content relating to a pitch in a baseball game and catch anomalies that the MLE model in the match state predictor 11 cannot recognize or analyze. In this embodiment, the historical event data contained in the DB 40 does not include the batting or the hitting player data associated with the pitch. In this particular example, the event record corresponding to the pitch can be determined by a processor (not shown) in the error correction system 13 as containing a predicted anomaly, as well as the confidence score that the anomaly is likely. The anomaly can be determined by the processor, for example, checking the event record for values corresponding to batting data fields or hitting player data fields and determining whether the fields are null, or the event record is missing the data fields.

In a non-limiting embodiment, the error correction system 13 can be arranged to include a user interface and a database table or access the database table in the DB 40. The user interface can be configured to access and define values in the database table. The definable values can include acceptable values for a given event, which in a non-limiting example can include a drive result in a football game. In this example, the definable parametric values can include, for example, TOUCHDOWN, FIELDGOAL, or TURNOVER, and if the real-time event update received from the live data feed 60 includes a drive result (for example, SAFETY) that is outside the values (TOUCHDOWN, FIELDGOAL, TURNOVER), the error correction system 13 can be arranged to quarantine the corresponding portion of the multimedia content. The multimedia content portion can be quarantined, for example, until the database table is updated to indicate the received drive result (SAFETY) is an acceptable parametric value. The parametric values in the database table can be updated, for example, via the user interface or an instruction received via the live data feed 60 that provided the original multimedia content.

In a non-limiting embodiment, the error correction system 13 is arranged to load all multimedia content, including event updates, received from the live data feed 60 into the DB 40, and analyze all of the multimedia content to identify any parametric variable that was not previously recognized or identified. If a previously unseen or unrecognized variable is encountered during the analysis, the error correction system 13 is arranged to tag the record containing that parametric variable and store the record in an error table in the database with metadata. The error correction system 13 can create one or more fields, including, for example: (1) the raw record from the JSON filed; (2) the serialized "resolution_callback"; (3) the particular field (or location) in the record that had an issue; (4) timestamps (date, time) ingestions tried to occur; and (5) an initial Boolean flag that indicates the status of whether the anomaly is resolved. The error correction system 13 can be arranged to generate and send a notification that an anomaly was identified in a particular data feed ingestion step.

Once the anomaly is predicted, the error correction system 13 can interact with the DB 40 and cause the corresponding record to be quarantined by, for example, rendering the data field containing the anomaly or any other part of event record unreadable. The quarantined record can include an error tag, which can be referenced and used to search for corresponding event data that can be used to correct the anomaly or replace or update an element in the event record containing the anomaly. The error tag can be stored until the event record has been updated to remove or correct the anomaly, thereby prohibiting access to the event record by the match state predictor 11 or the match state collector unit 12 until the error tag is removed. This can prevent self-adjusting by the MLE model based on the anomaly, which otherwise might cause the MLE model to output a prediction with an erroneous confidence score for the match event at some future time (for example, 1 minute, 10 minutes, or more from real-time).

Figure 3:
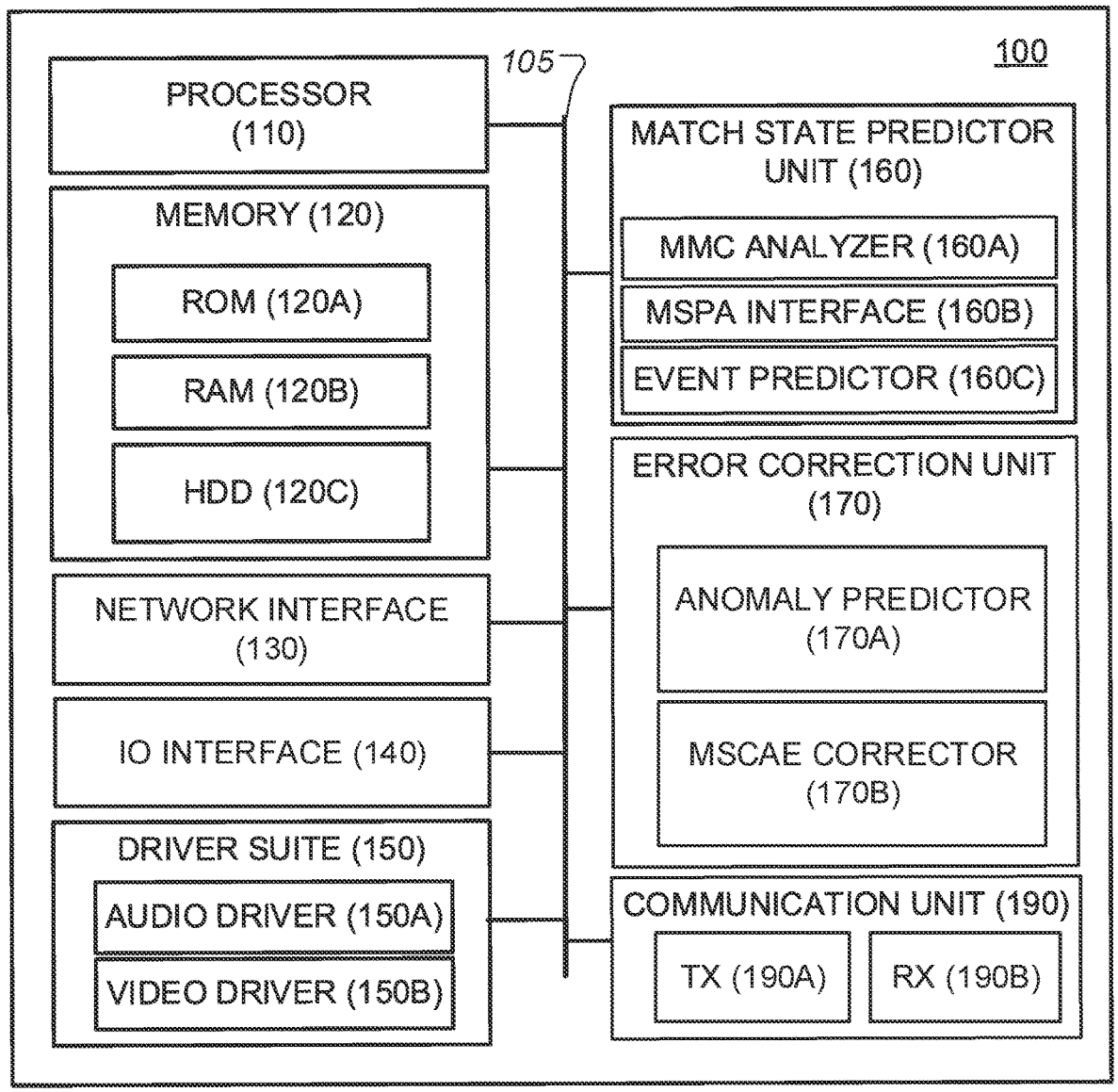
FIG. 3 shows a block diagram of a non-limiting embodiment of a self-calibrating event system, constructed according to the principles of the disclosure.

FIG. 3 illustrates a non-limiting embodiment of a self-calibrating event (SCE) system 100, constructed according to the principles of the disclosure. The SCE system 100 can be included in, for example, the SCMS server 10 (shown in FIG. 1 or 2). The SCE system 100 can include a processor 110, a memory 120, a network interface 130, an input-output (IO) interface 140, a driver suite 150, a match state predictor unit 160, an error correction unit 170, and a communication unit 190, all of which can be arranged to connect to a bus 105. The match state predictor unit 160 can include the match state predictor 11 (shown in FIG. 2) and the match state collector 12 (shown in FIG. 2). The error correction unit can include the error correction system 13 (shown in FIG. 2). The memory 120 can include the DB 40 (shown in FIGS. 1 and 2). The communication unit 190 can include one or more devices such as, for example, a transmitter 190A, a receiver 190B, a transceiver (not shown), a modulator (not shown), a demodulator (not shown), a modem (not shown), an encoder (not shown), or a decoder (not shown).

The processor 110 can include a computing device, such as, for example, any of various commercially available graphic processing unit devices. Dual microprocessors and other multi-processor architectures can be included in the processor 110. The processor 110 can include a central processing unit (CPU), a graphic processing unit (GPU), a general-purpose GPU (GPGPU), a field programmable gate array (FGPA), an application-specific integrated circuit (ASIC), or a manycore processor.

The processor 110 can be arranged to process instructions for execution within the SCE system 100, including instructions stored in the memory 120. The processor 110 can process instructions to display graphical information for a GUI on an external input/output device, such as a display device coupled to the IO interface 140 or the high-speed interface (not shown). In other implementations, multiple processors and/or multiple buses can be used, as appropriate, along with multiple memories and types of memory.

The SCE system 100 can include a non-transitory computer-readable medium that can hold executable or interpretable computer program code or instructions that, when executed by the processor 110, can cause the steps, processes and methods in this disclosure to be carried out. The computer-readable medium can be contained in the memory 120.

The memory 120 can include a read only memory (ROM) 120A, a random-access memory (RAM) 120B and a hard disk drive (HDD) 120C. A basic input/output system (BIOS) can be stored in the non-volatile memory, which can include, for example, the ROM 120A. The ROM 120A can include an erasable programmable rea-only memory (EPROM) or an electrically erasable programmable read-only memory (EEPROM). The BIOS can contain the basic routines that help to transfer information and instructions between computer assets 105 to 190 in the SCE system 100, such as during start-up.

The RAM 120B can include a dynamic random-access memory (DRAM), a synchronous dynamic random-access memory (SDRAM), a static random-access memory (SRAM), a non-volatile random-access memory (NVRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown). The HDD 120C can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), or any other suitable interface for external applications.

The memory 120 can provide nonvolatile storage of data, data structures, and computer-executable code or instructions. The memory 120 can accommodate the storage of any data in a suitable digital format. The memory 120 can include one or more computer applications that can be used to execute aspects of the architecture described herein. The memory 120 can include, for example, flash memory or NVRAM memory.

One or more computer resources can be contained in the memory 120, including, for example, an operating system (not shown), one or more application programs (not shown), one or more APIs, and program data (not shown). The APIs can include, for example, JSON APIs, XML APIs, Web APIs, SOAP APIs, RPC APIs, REST APIs, or other utilities or services APIs. Any (or all) of the computer programs can be cached in the RAM 120B as executable sections of computer program code.

The network interface 130 can be connected to a network such as the network 50 (shown in FIG. 1). The SCE system 100 can connect to one or more communicating devices (for example, computer assets 15, 20, 30, or 40, shown in FIG. 1) via, for example, the network interface 130 communicating with each communicating device over a communication link. The network interface 130 can be connected to the network 50 via one or more communication links (shown in FIG. 1). The network interface 130 can include a wired or a wireless communication network interface (not shown) or a modem (not shown). When used in a local area network (LAN), the SCE system 100 can be connected to the LAN network through the wired or wireless communication network interface; and, when used in a wide area network (WAN), the SCE system 100 can be connected to the WAN network through the modem. The network 50 (shown in FIG. 1) can include a LAN, a WAN, the Internet, or any other network. The modem (not shown) can be internal or external and wired or wireless. The modem can be connected to the bus 105 via, for example, a serial port interface (not shown).

The IO interface 140 can be arranged to receive commands and data from, for example, the communicating device 15 (shown in FIG. 1), which can be interacted with by a user, such as, for example, a system administrator. The IO interface 140 can be arranged to connect to or communication with one or more input/output devices (not shown), including, for example, a keyboard (not shown), a mouse (not shown), a pointer (not shown), a microphone (not shown), a speaker (not shown), or a display (not shown). The received commands and data can be forwarded from the IO interface 140 as instruction and data signals via the bus 105 to any computer asset in the SCE system 100.

The driver suite 150 can include an audio driver 150A and a video driver 150B. The audio driver 150A can include a sound card, a sound driver (not shown), an IVR unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The match state predictor unit 160 can include one or more computing devices, or it can be included in one or more computing devices. The match state predictor unit 160 can include the match state predictor 11 (shown in FIG. 2), including the INT platform or MLE model. In a non-limiting embodiment, the match state predictor 160 can include a multimedia content (MMC) analyzer 160A, a match state predictor analyzer (MSPA) interface 160B and an event predictor 160C.

The MMC analyzer 160A can be arranged to receive, for a particular event, real-time event updates from the live data feed 60 (shown in FIG. 2) via the MSPA interface 160B. The MMC analyzer 160A can be arranged to analyze the received updates and interact with the event predictor 160C to generate an event state prediction for the particular event together with a confidence score that the predicted event state is likely to occur at a particular time in the future. The MMC analyzer 160A can be arranged, in analyzing the received real-time event updates, interact with a match state collector contained in the event predictor 160C or historical event data contained in the DB 40. The event predictor 160C can include the match state collector 12 (shown in FIG. 2). The current match state stored in the event predictor 160C can be updated with the real-time event updates received from the live data feed 60. In an embodiment, the current match state can be contained in the memory 120 and managed by the event predictor 160C, in which case the memory 120 can be updated with the new event updates under control of the event predictor 160C.

The event state prediction and confidence score generated by the event predictor 160C can be output to the communication unit 190 for transmission to, for example, the communicating device 30 (shown in FIG. 1). The event state prediction and confidence score can be stored in the memory 120 and compared to previously predicted event states and corresponding actual event states to adjust parametric values of the MLE model.

The error correction unit 170 can include an anomaly predictor 170A. The error correction unit can include a match state collector and error (MSCAE) corrector 170B. The error correction unit 170 can include one or more computing devices, or it can be included in one or more computing devices. The anomaly predictor 170A and MSCAE corrector 170B can be provided as separate computer assets or integrated as single a computer asset. The anomaly predictor 170A and MSCAE corrector 170B can each include an INT platform, or an INT platform can be configured as the anomaly predictor 170A and/or MSCAE corrector 170B.

In a non-limiting embodiment, the error correction unit 170 includes an INT platform that can take as input: (1) the current live data feed update from the multimedia content received from the Live data feed 60; (2) the current match state corresponding to the live data feed; (3) historical event data of all past live data feed updates; and (4) historical event data of all past match states. The current and past match states can be retrieved from the memory 120.

The error correction unit 170 can include an INT platform containing supervised, unsupervised or a combination of supervised and unsupervised machine learning, including, for example, ANN, CNN, TCN, DCNN, RCNN, Mask-RCNN, DCED, RNN, NTM, DNC, SVM, DLNN, LSTM, Naive Bayes, decision trees, linear regression, Q-learning, TD, deep adversarial networks, fuzzy logic, or any other machine intelligence platform capable of supervised or unsupervised machine learning. The error correction unit 170 can include a match state machine learning (MSML)

model and one or more platform-neutral or platform-agnostic APIs. The INT platform can include, for example, SR, SVR, Ridge Regression (Ridge), RF, ARIMA, VAR, AFE, ETR, MLPR, VECM or another statistical forecasting technology.

The anomaly predictor 170A can be arranged to receive, as an input to the MSML model, real-time updates from the live data feed 60 (shown in FIG. 2) for a match event under consideration and monitor the updates. The anomaly predictor 170A can be arranged to interact with the MSCAE corrector 170B each time an update is received in the live data feed, to receive the current match state corresponding to the update. The current match state can be contained in the RAM 120B and managed by the MSCAE corrector 170B. In an embodiment, the MSCAE corrector 170B can include a storage (not shown) that can contain the match state information.

The anomaly predictor 170A can be arranged to recognize, by the MSML model, the context provided by the live data feed and the current match state from the MSCAE corrector 170B. The anomaly predictor 170A can be arranged to send an update to the MSCAE corrector 170B, wherein the update can include, for example, an instruction or recommendation to correct, ignore, or extract as-is an elements of the live data feed that is predicted to include an anomaly. The update sent to the MSCAE corrector 170B can include a confidence score relating to each element, indicating the probability that that element contains an anomaly, or, alternatively, is correct. The MSCAE corrector 170B can be arranged, in response to the instruction or recommendation from the anomaly predictor 170A, to update the related match state based on the instruction or recommendation. The MSCAE corrector 170B can be arranged to take action with respect to each element in the update based on the associated confidence score.

The anomaly predictor 170A can be arranged, after making a prediction on the accuracy of each element of the live data feed, to follow a rule-based decision tree and provide one or more actions that the MSCAE corrector 170B can take to update its memory of match states using the live data feed. An initial rule-based decision tree can be defined a priori in the anomaly predictor 170A, and the model may either remain static, or it may self-update as part of a feedback loop that takes into account impacts of decisions made by, for example, a non-limiting example of a decision tree depicted in FIG. 4. In an embodiment, the instruction or recommendation output by the anomaly predictor 170A to the MSCAE corrector 170B can include: the accuracy of the data element, determined by the MSML model; the processor time or memory capacity required to process an inaccurate data element; and, the ability to successfully correct a data element, either through direct action or through waiting for an update.

In an embodiment, the match state predictor unit 160 and the error correction unit 170 can be arranged in a single computing device as one or more INT platforms, including, for example, the MLE model and the MSML model.

In an embodiment, the error correction unit 170 can be arranged to identify or predict the presence of an anomaly in the live data feed. Based on historical event data and/or current match state data, the error correction unit 170 can resolve the anomaly, wherein the resolution can include, for example, correcting, ignoring, or extracting as-is the particular element of the live data feed that contains the anomaly. After identifying an anomaly in the live data feed, the error correction unit 170 can quarantine the corresponding record, or a portion thereof, containing the anomaly and either (1) encode the corresponding object into, for example, a JSON string, thereby serializing the element (including anomaly), or (2) via, for example, a user interface or a database table, update the element (including anomaly) with an updated/corrected element. Regarding the latter, the record can be quarantined, for example, until the database table is updated to indicate the received element is an acceptable value. The values in the database table can be updated, for example, via the user interface or an instruction from the live data feed 60 that provided the live data feed.

In a non-limiting embodiment, the match state predictor unit 160 and the error correction unit 170 can be arranged to select, download, upload, create or build one or more ML models that can be used to predict event states, including details of each state, based on, as well as anomalies in, the live data feeds from the live data feeds 60. The match state predictor unit 160 and the error correction unit 170 can be arranged to build ML models autonomously, without any user intervention, by, for example, building the models using model transformation. The ML model can be created to include a Transformer model. The ML model can be built to listen for, monitor and analyze multimedia content on the live data feeds 60 and predict the next likely event state and/or anomaly. The ML model can be built to learn from training data (for example, labeled training data). The training data can include the training datasets stored in the DB 40, which can be retrieved and used to train the ML model(s).

In a nonlimiting embodiment, the match state predictor unit 160 and the error correction unit 170 can be arranged to build or operate the INT platform so that it is operator-agnostic and/or platform-agnostic. The INT platform can be arranged as an aggregate of one or more ML models that can integrate with or be incorporated in the front-end computer executable code of, for example, the communicating device 15 or 30 (shown in FIG. 1).

The communication unit 190 can be arranged to receive a predicted event state and corresponding confidence score(s) from, for example, the match stage predictor unit 160, and, based on the predicted event state and corresponding confidence score(s), send an event prediction to the communicating device 15 or 30 (shown in FIG. 1). The event prediction can include a prediction for each of a plurality of variables for a given event, such as, for example, a sporting match event. In this example, the event prediction can include a prediction of the team likely to win the sport match event, a prediction of the likely scores at the end of the sport match event, a prediction each performance metric for each player (for example, number of hits, number of goals, etc.) in the sport match event, among others. The event state predication can include a confidence score for each predicted variable for that event.

Figure 4:
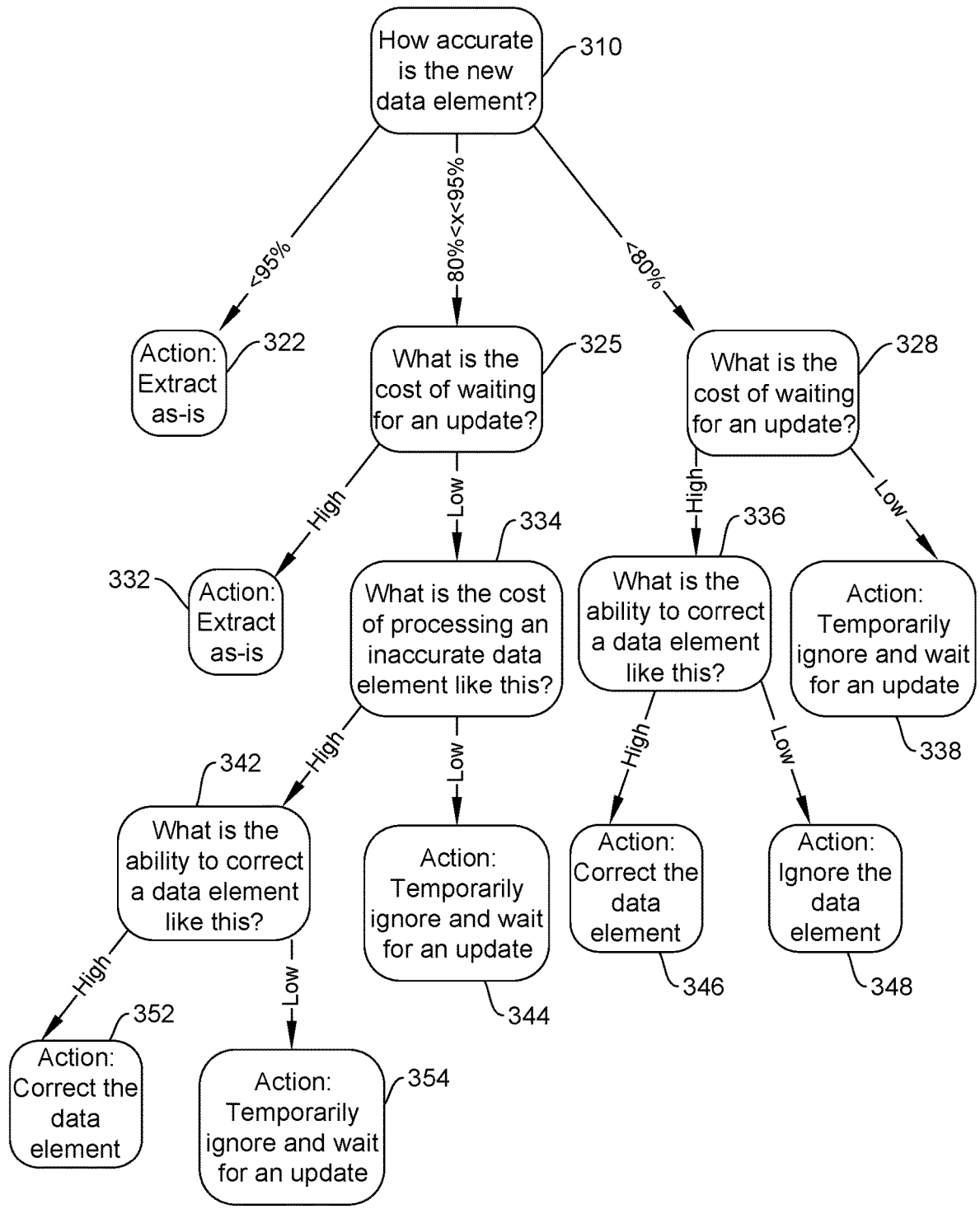
FIG. 4 shows a block diagram of a non-limiting example of a decision tree that can be implemented according to the principles of the disclosure.

FIG. 4 shows a non-limiting example of a decision tree that can be implemented by the SCE system 100 (shown in FIG. 3), according to the principles of the disclosure. The decision tree can be implemented by, for example, the error correction unit 170 (shown in FIG. 3). In this non-limiting example, the live data feed received from live data feed 60 (shown in FIG. 2) can be analyzed and a prediction made as to the accuracy of the data elements in the live data feed (310). Depending on the confidence score of the prediction, a decision can be taken: to extract the data element as-is (322) if the confidence score is greater than 95%; determine the computer resources necessary to ignore the data element and wait for an update while continuing with processing (325) if the confidence score is between 80% and 95%; or determine the computer resources necessary to wait for an update and determine whether to correct the data element (328) if the confidence score is less than 80%. The decision criteria in (325) can be different than in (310). In (310), "accuracy" can be evaluated, but in (325) the cost associated with "waiting" can be assessed and determined to be either High or Low.

Depending on whether the determination (325) is High or Low, a determination can be made whether the "cost of waiting" is High or Low and if it turns out to be High, element can be extracted as-is (332). If, however, the "cost of waiting" is determined to be Low, then a determination can be made regarding the cost of processing the inaccurate data element (334). If the cost of processing the data element (334) is determined to be High, then a determination can be made whether the data element can be corrected by the error correction unit 170 (342), otherwise the data element can be temporarily ignored until an update is received (344). If it is determined (342) that the error correction unit 170 is highly likely (High) to be able to correct the data element, then the data element is corrected (352), otherwise the data element is ignored (354).

Depending on whether the determination (328) is High or Low, a determination can be made regarding the ability of the error correction unit 170 to correct the data element (336) or temporarily ignore and wait for an update for the data element (338). If it is determined (336) that the error correction unit 170 is highly likely (High) to be able to correct the data element, then the data element is corrected (346), otherwise the data element is ignored (348).

Figure 5:
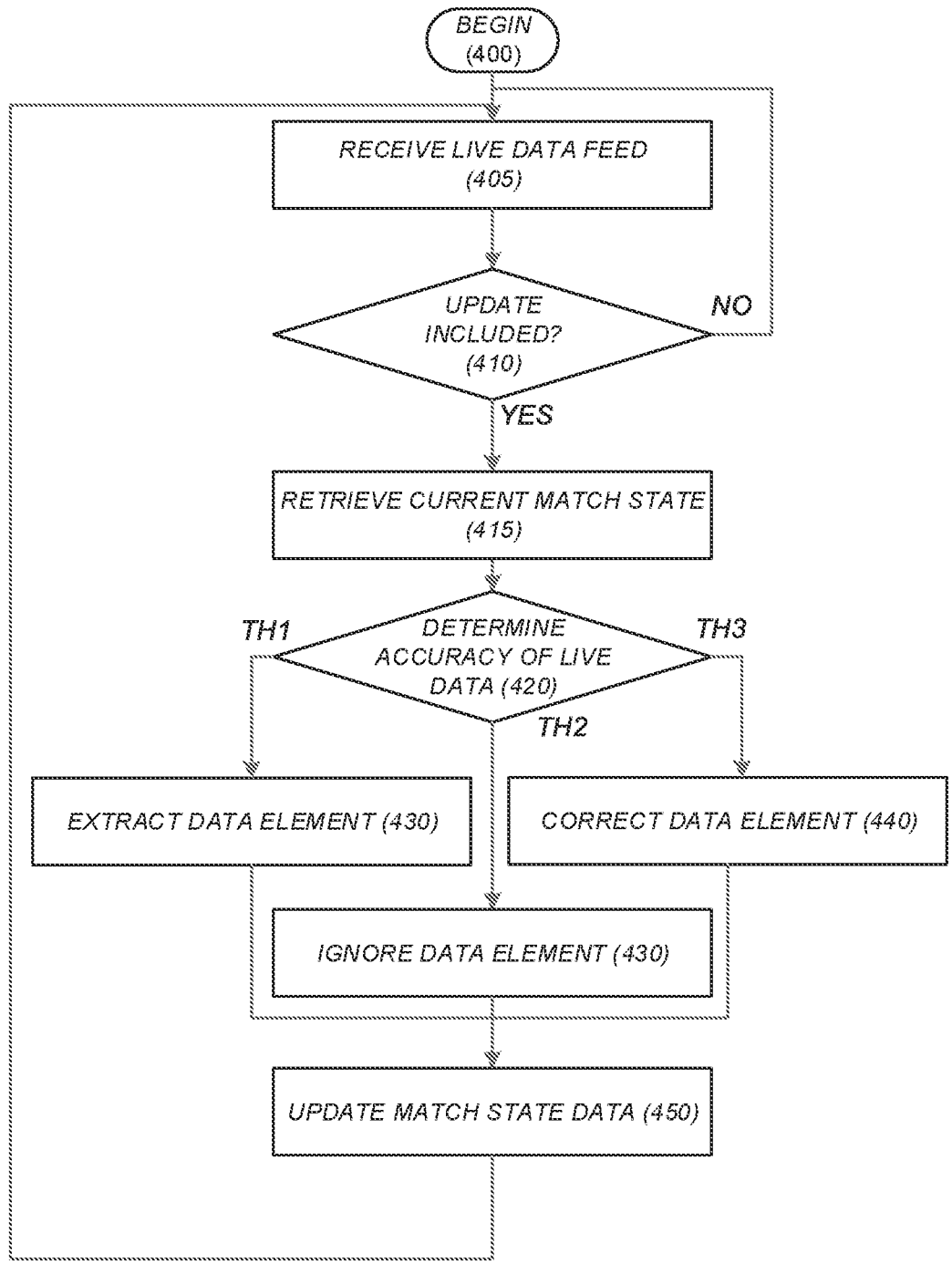
FIG. 5 shows a non-limiting embodiment of an anomaly resolution process, according to the principles of the disclosure.

FIG. 5 shows a non-limiting embodiment of an anomaly resolution process 400, according to the principles of the disclosure. Referring to FIGS. 2, 3 and 5 contemporaneously, the live data feed 60 can be received by the error correction unit 170 (Step 405) and monitored for an update for an underlying event (Step 410). If an update is detected by the error correction unit 170 (YES at Step 410), then the current match state corresponding to the update is retrieved (Step 415), otherwise the error correction unit 170 continues to monitor the live data feed for updates (NO at Step 410, then Step 405). The detected update can be compared against the corresponding current match state and a prediction made, by the error correction unit 170, regarding the accuracy of all the elements of the update (Step 420).

Based on the analysis made by the error correction unit 170, an element of the update can be predicted to include an anomaly and a corresponding confidence score determined for that element (Step 420). In this non-limiting embodiment, the confidence score can fall within one of three score ranges TH1, TH2 or TH3. Referring to the non-limiting example in FIG. 3, TH1 can be the range from 95% to 100%, TH2 can be the range from 80% to 94.99999%, and TH3 can be the range from 0% to 79.99999%.

If received multimedia content is predicted to be accurate with a confidence score in the range TH1 (Step 420, TH1), then the element that multimedia content can be extracted (Step 430) and applied to an input of, for example, the MLE model (discussed above) to predict a future event state. The match state data can be updated to indicate that the multimedia content record has been extracted and forwarded in the machine learning pipeline (Step 450).

If the multimedia content is predicted to be accurate with a confidence sore in the range TH2 (Step 420, TH2), then the element of the multimedia content that is predicted can be tagged and either quarantined or ignored (Step 430). Referring to the non-limiting embodiment depicted in FIG. 3, the Step 420 can include the Steps 310, 325, 332, 334, 342, 344, 352 and/or 354. The match state data can be updated accordingly for that the record containing the element (Step 450).

If the multimedia content is predicted to be accurate with a confidence sore in the range TH3 (Step 420, TH3), then element containing the anomaly can be corrected (Step 440). Referring to the non-limiting embodiment depicted in FIG. 3, the Step 420 can include the Steps 310, 328, 336, 338, 346, and/or 348. The match state data can be updated accordingly for that the record containing the element (Step 450).

The match state data can be updated to indicate that the record containing the anomaly has been corrected (Step 450).

In a non-limiting embodiment, the process 400 can be adapted to include and operate according to the non-limiting embodiment of the decision tree depicted in FIG. 4.

The terms "a," "an," and "the," as used in this disclosure, means "one or more," unless expressly specified otherwise.

The term "activity," as used in this disclosure with regard to a communicating device, means an input, entry, instruction, selection, action, or any interaction with the communicating device by a client-side user that can cause the communicating device to perform or carry out a process, task, function, or operation. An "activity" can include, for example, launching a client app such as a web browser in the communicating device or interacting with the client app to find, fetch, load, process, or render a computer resource based on a sequence of input data or instructions (for example, an entry comprising a single or a sequence of natural language terms).

The term "backbone," as used in this disclosure, means a transmission medium or infrastructure that interconnects one or more computing devices or communicating devices to provide a path that conveys data packets or instructions between the computing devices or communicating devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device" or "communication device," as used in this disclosure, means any computing device, hardware, or computing resource that can transmit or receive digital or analog signals or data packets, or instruction signals or data signals over a communication link. The device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM voice calls, SMS, EMS, MMS messaging, CDMA, TDMA, PDC, WCDMA, CDMA2000, GPRS, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules, which can be capable of manipulating data according to one or more instructions, such as, for example, without limitation, a processor, an application specific integrated circuit (ASIC), a field programmable gate array (FPGA), a microprocessor (μP), a central processing unit (CPU), a graphic processing unit (GPU), a general purpose computer, a super computer, a personal computer, a laptop computer, a palmtop computer, a notebook computer, a smart phone, a mobile phone, a tablet, a desktop computer, a workstation computer, a server, a server farm, a computer cloud, or an array of processors, ASICS, FPGAs, μPs, CPUs, GPUs, general purpose computers, super computers, personal computers, laptop computers, palmtop computers, notebook computers, desktop computers, workstation computers, or servers. A computer or computing device can include hardware, firmware, or software that can transmit or receive data packets or instructions over a communication link. The computer or computing device can be portable or stationary.

The term "computer asset," as used in this disclosure, means a computer resource, a computing device, a communicating device, or a computer-readable medium.

The term "computer resource," as used in this disclosure, means software, a software application, a web application, a webpage, a document, a file, a record, an application program(ming) interface (API), web content, a computer application, a computer program, computer code, machine executable instructions, or firmware. A computer resource can include an information resource. A computer resource can include machine instructions for a programmable computing device, and can be implemented in a high-level procedural or object-oriented programming language, or in assembly/machine language.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "information resource," as used in this disclosure means, but is not limited to, computer code or computer executable instructions that cause content to be displayed on a display device, or to invoke a function to display the content such as on a website or webpage that includes primary content or a search results landing page provided by a search engine.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for predicting a match state event by a machine learning platform on a server, the method comprising:
   receiving at the server, by the machine learning platform, a live data feed from an application program interface (API);
   analyzing at the server, by the machine learning platform, multimedia content on the live data feed;
   receiving at the server, by the machine learning platform, current match state data corresponding to the multimedia content, wherein the current match state data is based on a current state of a live match;
   predicting at the server, by the machine learning platform, an anomaly in the multimedia content based on the analysis of received multimedia content and an analysis of the current match state data;
   resolving at the server, by the machine learning platform, the predicted anomaly by (i) encoding a portion of the multimedia content containing the predicted anomaly, (ii) storing the serialized anomaly and a corresponding serialized function that specifies how to resolve the anomaly, and (iii) executing the serialized function based on the serialized anomaly, wherein executing the serialized function causes extracting a portion of the multimedia content containing the anomaly, ignoring the anomaly, or correcting the anomaly;
   predicting at the server, by the machine learning platform, a future match state based on the current match state data and the multimedia content, including the resolved anomaly; and
   sending, by a transmitter, the future match state to a communicating device.

2. The computer-implemented method in claim 1, further comprising:
   forwarding the extracted portion of the multimedia content to an intelligent technology platform to analyze and predict a future match state event based, at least in part, on the multimedia content.

3. The computer-implemented method in claim 1, further comprising:
   receiving, by the machine learning platform, historical event data comprising past live data feed updates.

4. The computer-implemented method in claim 1, further comprising:
   receiving, by the machine learning platform, historical event data comprising past match states.

5. The computer-implemented method in claim 1, further comprising:
   receiving, by the machine learning platform, historical event data comprising past live data feed updates and past match states.

6. The computer-implemented method in claim 1, wherein the predicting, by the machine learning platform, the anomaly in the multimedia content includes analyzing past live data feed updates and past match states.

7. The computer-implemented method in claim 1, further comprising:
   determining processor computing time or memory capacity required to correct the anomaly.

8. The computer-implemented method in claim 1, wherein resolving the anomaly comprises:
   predicting, by the machine learning platform, correctability of the anomaly.

9. The computer-implemented method in claim 8, wherein correctability of the anomaly comprises waiting for an update of the multimedia content that resolves the anomaly.

10. A system for predicting a match state event by a machine learning platform on a server, the system comprising:
    a communication unit that includes a transmitter and a receiver, the receiver being arranged to receive a live data feed;
    a match state collector that includes a memory arranged to store match state data;
    an anomaly predictor having a machine learning system arranged to
        monitor multimedia content on the live data feed,
        receive current match state data that is based on a current state of a live match and that corresponds to the multimedia content, and
        predict, by a machine learning platform, accuracy of the multimedia content based on the multimedia content and corresponding match state data, utilizing one or more specialized neural network models trained to interpret the multimedia content; and
    an error corrector having a computing device arranged to resolve an anomaly in the multimedia content based on the predicted accuracy of the multimedia content, wherein resolving the anomaly includes (i) encoding a portion of the multimedia content containing the predicted anomaly, (ii) storing the serialized anomaly and a corresponding serialized function that specifies how to resolve the anomaly, and (iii) executing the serialized function based on the serialized anomaly, wherein executing the serialized function causes extracting a portion of the multimedia content containing the anomaly, ignoring the anomaly, or correcting the anomaly; and
    a match state predictor having a machine learning event (MLE) model arranged to predict a future match state based on the current match state data and the multimedia content, including the resolved anomaly,
    wherein the transmitter is configured to send the future match state to a communicating device.

11. The system in claim 10, wherein the match state predictor is arranged to receive the multimedia content and predict a future event based, at least in part, on the multimedia content.

12. The system in claim 10, wherein the anomaly predictor is further arranged to receive historical event data comprising past live data feed updates.

13. The system in claim 10, wherein the anomaly predictor is further arranged to receive historical event data comprising past match states.

14. The system in claim 10, wherein the anomaly predictor is further arranged to receive historical event data comprising past live data feed updates and past match states.

15. The system in claim 10, wherein the machine learning system is trained to:
   receive historical event data comprising past live data feed updates and past match states; and
   predict the anomaly in the multimedia content based, at least in part, on the past live data feed updates and the past match states.

16. The system in claim 10, wherein the machine learning system is trained to:
   determine processor computing time or memory capacity required to correct the anomaly.

17. The system in claim 10, wherein the machine learning system is trained to:
   predict correctability of the anomaly.

18. The system in claim 17, wherein correctability of the anomaly comprises waiting for an update of the multimedia content that resolves the anomaly.

19. A non-transitory computer-readable storage medium containing computer executable instructions that, when executed by a computing device coupled to a communication unit having a transmitter and a receiver and containing a machine learning system, cause the computing device to perform operations comprising:

receiving, by the receiver, a live data feed;
   monitoring, by the machine learning system, multimedia content on the received live data feed;
   receiving, from a memory coupled to the computing device, current match state data corresponding to the multimedia content, the current match state data being based on a current state of a live match;
   predicting, by the machine learning system, an anomaly in the multimedia content based on an analysis of received multimedia content and the current match state data, wherein the analysis utilizes one or more specialized neural network model trained to interpret the multimedia content;
   resolving, by the machine learning system, the predicted anomaly by (i) encoding a portion of the multimedia content containing the predicted anomaly, (ii) storing the serialized anomaly and a corresponding serialized function that specifies how to resolve the anomaly, and (iii) executing the serialized function based on the serialized anomaly, wherein executing the serialized function causes: extracting a portion of the multimedia content containing the anomaly, ignoring the anomaly, or correcting the anomaly;
   predicting, by the machine learning system, a future match state based on the current match state data and the multimedia content, including the resolved anomaly; and
   sending, by the transmitter, the future match state to a communicating device.

20. The non-transitory computer-readable storage medium in claim 19, wherein the machine learning system is trained to determine processor computing time or memory capacity required to correct the anomaly.

* * * * *